July 2, 1963
S. T. BUCK
3,095,591
TRAVELING RAMP FOR LOADING VEHICLES ONTO MULTIPLE DECK TRANSPORT
Filed Sept. 6, 1960
4 Sheets-Sheet 1
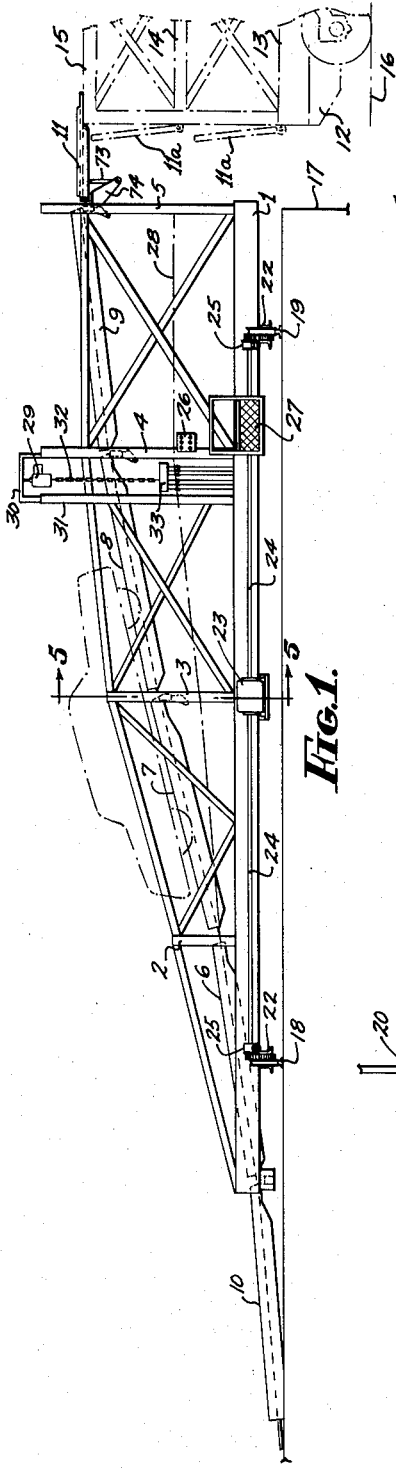
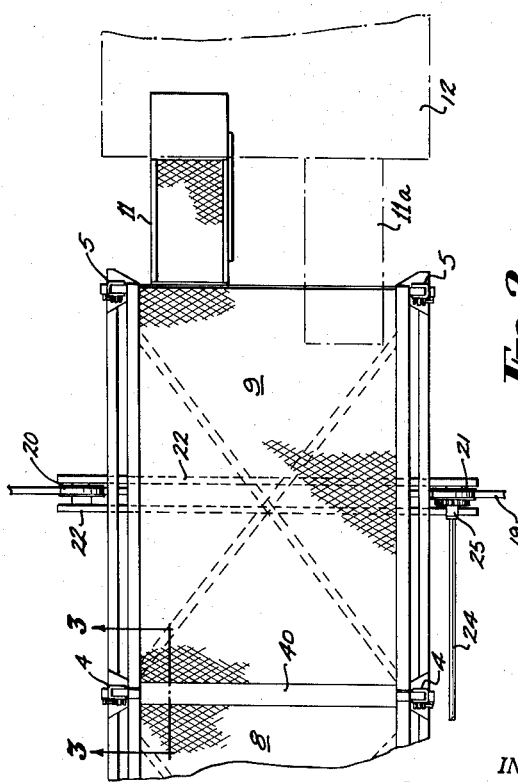
INVENTOR.
STEWARD T. BUCK,
BY Allen & Allen
ATTORNEYS.

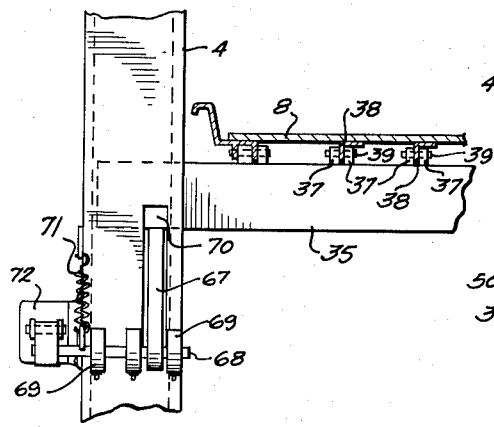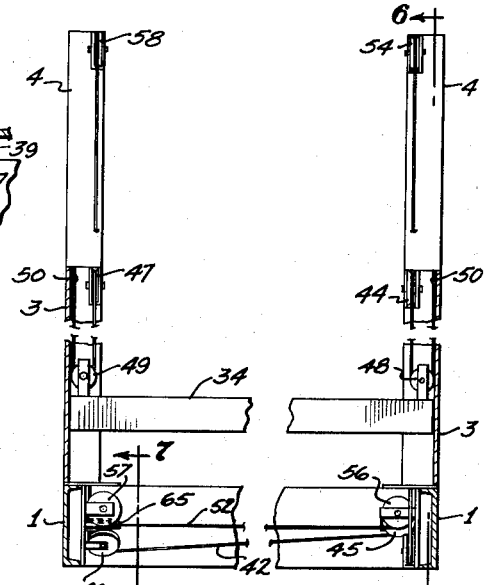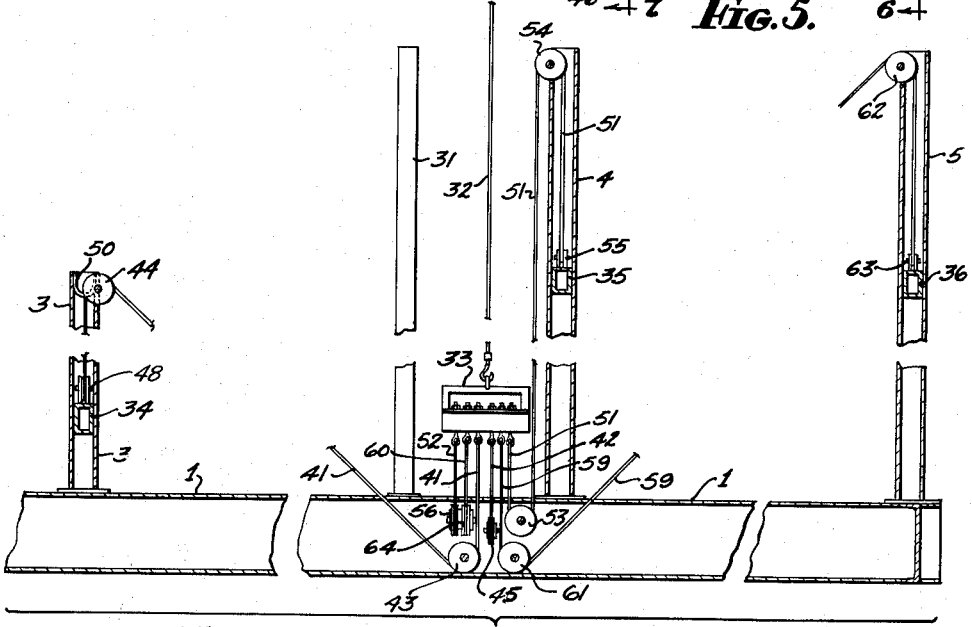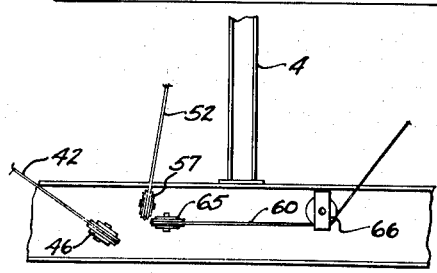

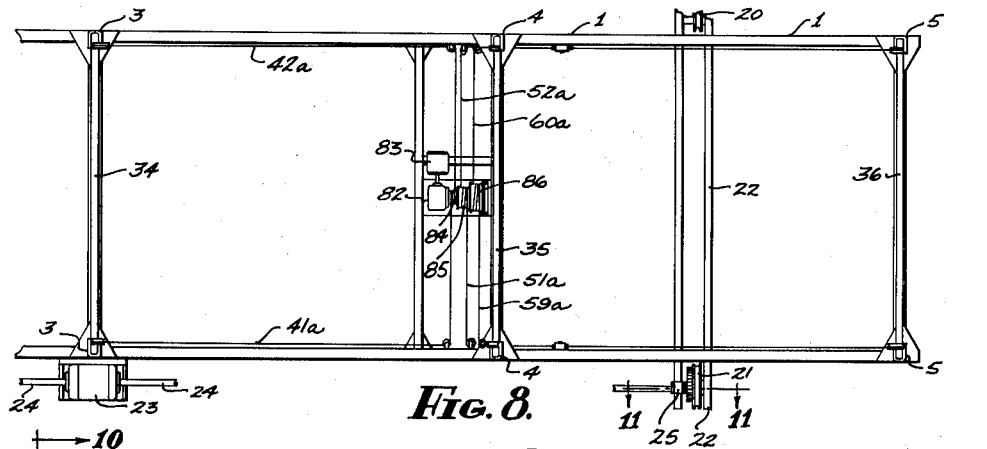
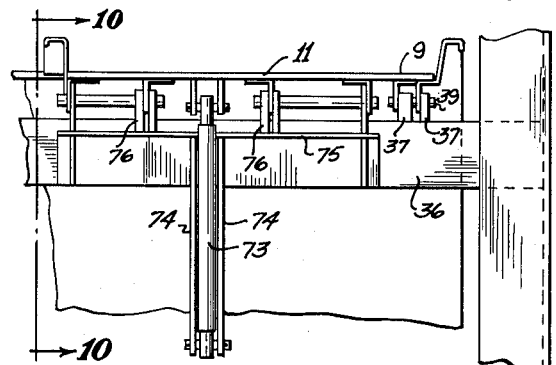
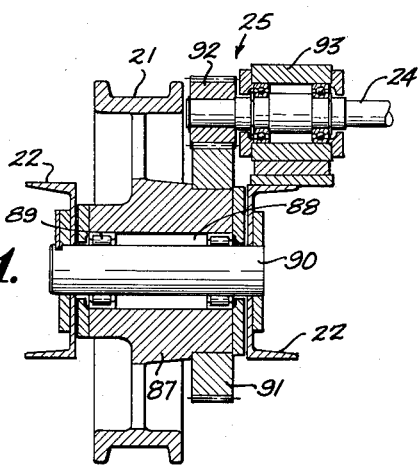
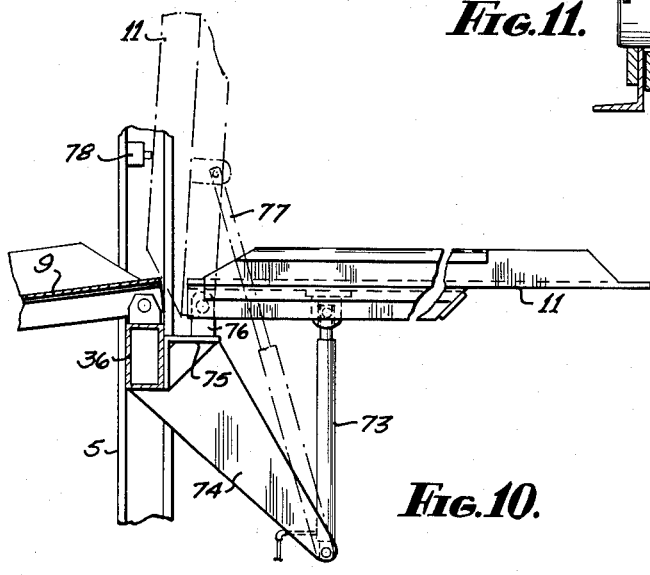

July 2, 1963

S. T. BUCK 3,095,591

TRAVELING RAMP FOR LOADING VEHICLES
ONTO MULTIPLE DECK TRANSPORT

Filed Sept. 6, 1960

INVENTOR.
STEWARD T. BUCK,

BY

ATTORNEYS.

3,095,591
TRAVELING RAMP FOR LOADING VEHICLES
ONTO MULTIPLE DECK TRANSPORT
Steward T. Buck, % Buck Equipment Corp., 720 Anderson Ferry Road, Cincinnati 38, Ohio
Filed Sept. 6, 1960, Ser. No. 54,028
7 Claims. (Cl. 14—72)

This invention relates to an adjustable loading ramp by means of which vehicles, such as automobiles, may be loaded onto a multiple deck transport, and relates more particularly to a mobile ramp adapted for use in conjunction with multiple deck railroad cars designed to transport vehicles.

In recent years multiple tiered or multiple deck railroad cars have been developed by means of which a relatively large number of automobiles and like vehicles may be transported about the country, such cars usually comprising three decks or tiers each capable of receiving a plurality of vehicles. Considerable difficulty has been experienced in loading railroad cars of this character due to the necessity for ramps by means of which the cars may be driven on to the several tiers. While the lowermost and intermediate tiers may be readily loaded employing collapsible ramp structures of much the same character as employed in conjunction with conventional two-deck truck transports, considerable difficulty has been encountered in providing an adequate ramp structure to reach the uppermost deck of a triple deck railroad car; and all such ramp structures require that they be assembled and disassembled as each deck is loaded, and this of course results in considerable manual labor in addition to being time consuming.

Accordingly, a principal object of the instant invention is the provision of a ramp installation which may be readily adjusted from one tier to another so that the railroad cars may be rapidly loaded.

Still another object of the invention is the provision of a mobile ramp structure which may move lengthwise of a loading dock so as to sequentially load a plurailty of railroad cars positioned on adjacent tracks or sidings abutting the loading dock.

Still a further object of the instant invention is the provision of a mobile ramp structure of the character described in which the ramp units may be readily raised and lowered from a central control point, and wherein a single hoist may be utilized to co-ordinate the raising and lowering of a plurality of ramp units or sections.

Still a further object of the instant invention is the provision of a mobile ramp of the character described embodying a cable lift system for the ramp together with automatically actuated locking devices for locking the ramp sections in their various positions of use. The foregoing, together with other objects of the invention which will appear hereinafter or which will be apparent to the skilled worker in the art upon reading these specifications, I accomplished by those constructions and arrangements of parts of which I shall now describe certain exemplary embodiments.

Reference is now made to the accompanying drawings wherein:

FIGURE 1 is a side elevational view of a mobile ramp in accordance with my invention.

FIGURE 2 is an enlarged fragmentary plan view of the ramp section adjacent the railroad car being loaded.

FIGURE 3 is an enlarged fragmentary vertical section taken along the line 3—3 of FIGURE 2.

FIGURE 4 is a fragmentary elevational view taken at right angles to the parts illustrated in FIGURE 3.

FIGURE 5 is an enlarged vertical sectional view taken along the line 5—5 of FIGURE 1.

FIGURE 6 is a vertical sectional view taken along the line 6—6 of FIGURE 5 illustrating the pulley mechanism controlling the ramp sections.

FIGURE 7 is a vertical sectional view taken along the line 7—7 of FIGURE 5.

FIGURE 8 is a fragmentary plan view of an alternative form of hoisting means for raising and lowering the ramp sections.

FIGURE 9 is an enlarged fragmentary side elevational view of the bridge member extending between the ramp and the railroad car being loaded.

FIGURE 10 is a vertical sectional view taken along the line 10—10 of FIGURE 9.

FIGURE 11 is an enlarged fragmentary vertical sectional view taken along the line 11—11 of FIGURE 8.

Figure 12:
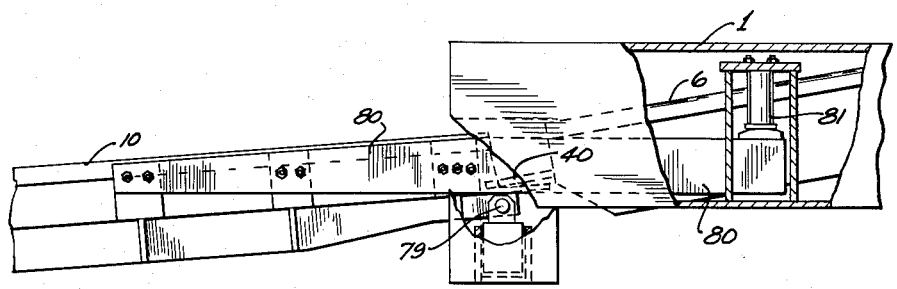
FIGURE 12 is an enlarged fragmentary side elevational view of the leftmost ramp section shown in FIGURE 1.

Referring first to FIGURE 1, the mobile ramp structure comprises a rectangular base frame 1 mounting spaced apart pairs of vertical standards 2, 3, 4 and 5 which coact to support the ramp section 6, 7, 8 and 9. The base frame 1 also mounts a tailgate section 10 and, at the opposite end of the structure, the ramp section 9 mounts a bridge member 11 which extends from the ramp to the railroad car 12 having a lower deck 13, an intermediate deck 14 and an upper deck 15. It will be understood that the railroad car 12 will lie on a siding 16 which abuts the loading dock 17 on which the ramp structure is mounted.

Figure 13:
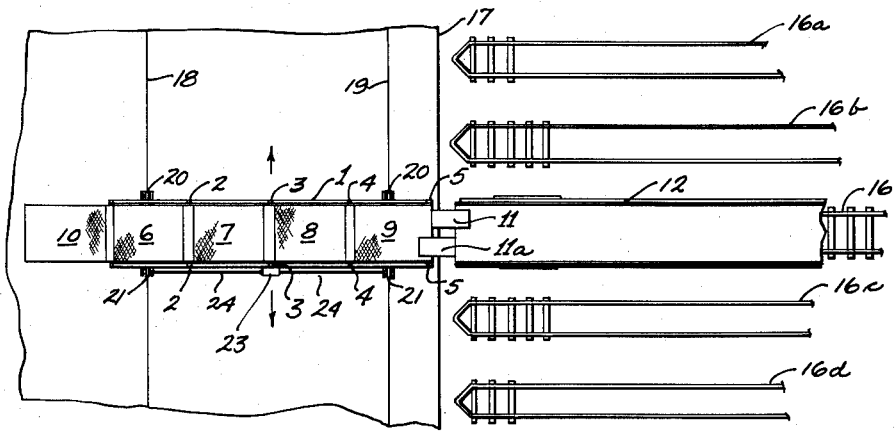
FIGURE 13 is a fragmentary plan view illustrating the mobile ramp and its use in conjunction with a plurality of sidings abutting the loading dock.

As seen in FIGURE 13, the loading dock 17 is preferably of considerable length and adapted to service a plurality of sidings, such as the sidings 16a through 16d extending in parallel relation to siding 16; and it will be understood that the ramp of the instant invention may be utilized with any number of such sidings.

The entire ramp structure is adapted to move lengthwise of the loading dock on spaced apart rails or tracks 18 and 19 which are contacted by pairs of wheels 20 and 21 suitably journaled in and supported by cross braces 22 secured to or forming a part of the base frame 1 (see FIGURE 2). A pair of the wheels, such as the wheels 21, are adapted to be driven by a prime mover 23 through drive shaft 24 and gear mechanism 25 which will be explained more fully hereinafter. Preferably, all of the controls for the ramp are concentrated at a control panel 26, the ramp operator being provided with a platform or cab 27 on which he may stand or sit when the device is in use.

In the embodiment of the invention illustrated in FIGURE 1, the lowermost ramp section 6 is fixedly secured to its supports whereas the ramp sections 7, 8 and 9 are adapted to be raised and lowered from the position shown, which effectively provides a ramp leading to the uppermost deck 15 of the railroad car, to an intermediate position, indicated by the line 28, in which position the ramp sections will communicate with the intermediate deck 14 of the railroad car. It will be understood that the lowermost deck 13 may be filled directly from the loading dock. The raising and lowering of the ramp section is effected, in the embodiment of FIGURES 1 through 7, by means of a hoist 29 which may be conveniently suspended from a support 30 extending between one of the standards 4 and a coacting standard 31. It will be understood that the hoist controls will be operatively connected to the control panel 26 so that the operator may readily actuate the hoist to either raise or lower the hoist chain 32 which is provided at its lower end with a cable bar 33 which, as will now be explained, serves to control the movement of a plurality of cables which act to raise and lower the ramp sections 7, 8 and 9 in unison. The raising and lowering of the ramp sections is by means of the ramp bars 34, 35 and 36 which, as possibly best seen in FIGURE 6, are adapted to move vertically between the pairs of vertical standards 3, 4 and 5, respectively. To this end, the pairs of standards are preferably channel shaped and the ramp bars are of a size to slidably fit therein. The ramp bar 34 which extends between the vertical standards 3 pivotally mounts the "high" end of ramp section 7, whereas the ramp bar 35 pivotally mounts the "high" end of ramp section 8 and ramp bar 36 pivotally mounts the "high" end of ramp section 9. The ramp sections may be pivotally mounted to their respective ramp bars in the manner seen in FIGURE 3 wherein the ramp bar is provided with ears 37 which receive the frame members 38 of the ramp section, the frame members being pivotally secured to the ears by means of pivot pins 39. As is also seen in FIGURE 3 the trailing or "low" end of each of the ramp sections, such as the section 9, terminates in a tongue 40 which overlies and is supported by the leading edge of the next adjacent ramp section. Thus, as the ramp bars are raised and lowered, each of the ramp sections will pivot relative to the ramp bar at its "high" end; and it will be free for sliding movement relative to the ramp bar at its trailing or "low" end by reason of the overlapping tongue which, in effect, acts as an expansion joint to compensate for displacement caused by variations in the angle of inclination of the ramp section as it is raised and lowered.

Each of the ramp bars is connected adjacent its ends to a pair of control cables secured to the cable bar 34. Thus, as seen in FIGURES 5, 6 and 7, the ramp bar 34, which raises and lowers the 'high" end of ramp section 7, is controlled by cables 41 and 42, the cable 41 passing downwardly around pulley wheel 43 and thence upwardly around pulley wheel 44 mounted at the upper end of the standard 3 on the near side of the device. The cable 42 passes downwardly about pulley wheel 45 and then extends transversely of the base frame, as seen in FIGURE 5, thence around pulley wheel 46 and upwardly to pulley wheel 47 at the upper end of the standard 3 on the far side of the base frame. The cables 41 and 42 are two part cables in that they pass downwardly about pulley wheels 48 and 49 secured to the ramp bar and thence upwardly along the standards 3 where their free ends are secured to the upper ends of the standards 3 by clamps 50.

The ramp bar 35 which moves lengthwise along the standards 4 and raises and lowers the "high" end of the ramp section 8 is controlled by cables 51 and 52, the former passing downwardly about pulley wheel 53, thence upwardly around pulley wheel 54 at the upper end of the near standard 4, and then downwardly where its end is secured by the clamp 55 mounted on the near end of ramp bar 35. The cable 52 passes downwardly about the pulley wheel 56, thence transversely of the base frame 1, as seen in FIGURE 5, and thence upwardly about pulley wheel 57 and around pulley wheel 58 at the upper end of the far standard 4. Its free end is clamped to the far end of ramp bar 35 in the same manner as the cable 51.

The cables 59 and 60 control movement of the ramp bar 36 movable lengthwise of the standards 5, the cable 59 passing downwardly about pulley wheel 61 and thence upwardly about pulley wheel 62 at the upper end of the near standard 5, whereupon the cable passes downwardly for engagement by the clamp 63. Cable 60 extends downwardly about pulley wheel 64 then traverses the base frame where it passes around pulley wheel 65 and thence forwardly along the base frame, as seen in FIGURE 7, and thence around pulley wheel 66 and thence upwardly to a pulley wheel (not shown) at the upper end of the far standard 5. Both the sets of cables 51, 52 and 59, 60 are single part cables so that they will move the ramp bars 35 and 36 substantially twice the distance the two part cables 41, 42 will move the ramp bar 34. While, with this arrangement, the ramp bars 35 and 36 move equal distances, their positions may be varied relative to each other by means of the lock stops now to be described.

One such lock stop is illustrated in FIGURES 3 and 4 wherein the standard 4 is provided with a stop 67 secured to a rock shaft 68 mounted in bracket 69 secured to the standard 4, the standard having an elongated opening 70 therein through which the stop is adapted to extend. A spring 71 biases the rock shaft 68 and the stop 67 to the ramp bar engaging position shown in FIGURE 3. In this position, the uppermost edge of the stop serves as a seat for the ramp bar, and the projection 67a abuts the side flange 4a of the standard so that the ramp bar is securely held thereby. It will be noted that the under surface 67b of the stop is inclined so that, as the ramp bar moves upwardly from beneath the stop, it will exert a camming action causing the stop to pivot in a counterclockwise direction against the tension of spring 71, thereby permitting the ramp bar to pass beyond the stop. Once the ramp bar has cleared the stop, the stop will be returned to the operative or bar engaging position by the spring 71.

As seen in FIGURE 4, the end of rock shaft 68 is engaged by a solenoid 72 which, when energized, serves to rock the shaft in a counterclockwise direction, thereby freeing the ramp bars. Hence the ramp sections are positively supported by the stops rather than by the cables at such times as automobiles or other vehicles would be driven over the ramp. Preferably, when the operator raises the ramp sections, from the intermediate to upper position, he will cause the ramp bars to pass upwardly beyond the stops and thereafter lower the ramp bars into contact with the stops. The cables are preferably payed out so that they are somewhat slack when the ramp bars are seated against their stops. This arrangement also permits relative adjustment between the height of the ramp bars 35 and 36 in that the stops for the ramp bar 35 may be disposed somewhat lower than the stops for the ramp bar 36, the ramp bars being permitted to settle down onto their respective stops by suitable slack in the cables.

As seen in FIGURES 9 and 10, the bridge member 11, which spans the distance between the end of ramp section 9 and the railroad car to be loaded, is hydraulically controlled by means of cylinder 73 mounted on arm 74 fixedly secured to the ramp bar 36 which also includes a stand 75 having lugs 76 which pivotally mount the inner end of the bridge member 11. The piston rod 77 engages the under surface of bridge member 11 and, when extended, serves to move the bridge member to the position illustrated in dotted lines in FIGURE 10. It is in this position, that is, with the bridge member extending essentially vertically, that the ramp device will be moved from one location to another and, preferably, one of the standards 6 will mount a limit switch 78 which will serve to lock out the actuating circuit for prime mover 23 when the bridge member 11 is in its lowermost or operative position, thereby preventing accidental movement of the entire ramp device during loading operation. It is also desirable to provide a similar lock out circuit to prevent accidental raising or lowering of the ramp section while the bridge member is in its lowermost or operative position.

It should be explained that only one such bridge member is required positioned to receive the wheels on only one side of the vehicles being loaded. This is because the railroad cars are provided with complementary bridge members 11a (for the wheels on the opposite side of the vehicles). Of course, should the necessity arise, the bridge member 11 could span the full width of the ramp.

It will be understood of course that the cylinder 73 could be pneumatic or, for that matter, any other suitably powered means could be employed to raise and lower the bridge member.

As seen in FIGURE 12, it is also desirable to pivot the tailgate section 10 so that it too may be elevated when the ramp device is moved along its track. To this end, the tailgate section 10 is pivoted to the base frame, as at 79, and the tailgate provided with arms 80 adapted to be engaged by the hydraulic cylinders 81 which, when actuated, serve to pivot tailgate section 10 upwardly by the distance such that its free end will clear the ground by a suitable distance. Here again, it is possible to provide limit switch means which will serve to prevent movement of the ramp device along its track unless the tailgate section has been elevated.

While in the embodiment of the invention illustrated in FIGURE 6, a hoist is used to raise and lower the various control cables, it is also possible to actuate the cables by other means, such as multiple part winch, which is illustrated in FIGURE 8. As seen therein, the winch 82 is adapted to be driven by a prime mover 83 mounted on the base frame structure, the winch having three side-by-side drum sections 84, 85 and 86 of progressively larger diameters. With this arrangement, the smallest diameter drum section 84 will receive the cables 41a and 42a controlling the movement of the ramp bar 34, the two cables being wound on opposite ends of the drum section 84. In similar fashion, the intermediate drum section 85 mounts cables 51a and 52a controlling the movement of ramp bar 35; and the drum section 86 mounts cables 59a and 60a controlling the movement of ramp bar 36. By use of the multiple part drum, precise control can be maintained over the length of travel of the several ramp bars, their travel being determined by the diameter of the drum sections.

In FIGURE 11 there is illustrated an exemplary driving connection between the prime mover 23 and the driven wheels 21. As seen therein, the wheel 21 has a hub 87 the bore 88 of which mounts bearing assemblies 89 surrounding axle 90 extending between the cross braces 22. The hub 87 mounts a gear 91 which is in meshing engagement with a gear 92 secured to the end of drive shaft 24, the shaft being rotatably journaled in bearing sleeve 93. It will be understood that various other forms of reduction gears may be employed, inclusive of variable speed mechanisms and clutch means, particularly if the prime mover comprises an internal combustion engine.

Modifications may of course be made in the invention without departing from the spirit and purpose of it. For example, it has already been indicated that diverse drive means may be employed for moving the ramp along the tracks; and several modifications of lifting means for the ramp sections have already been disclosed and undoubtedly others will readily occur to the skilled worker in the art upon reading these specifications. While solenoids are disclosed to actuate the lock stops for the ramp bars, hydraulic or pneumatic cylinders may be utilized for this purpose if so desired. Having, however, described my invention in certain exemplary embodiments, what is desired to be secured and protected by Letters Patent is:

1. An adjustable ramp structure for loading vehicles onto multiple tiered transports, said structure comprising an elongated base frame mounting a plurality of spaced apart pairs of vertically disposed standards projecting upwardly from said base frame at spaced apart intervals with the standards in each pair lying on opposite sides of said base frame, ramp bars extending transversely of said base frame between said pairs of standards with the opposite ends of said ramp bars slidably received by said pairs of standards, a ramp section extending between each adjacent pair of said standards so as to define a continuous ramp extending lengthwise of said structure, said ramp sections each being hingedly connected at its leading end to one of said ramp bars with its opposite end overlying and supported for sliding movement on the next adjacent ramp section, with the pivoted ends of said ramp sections all extending in the same direction, cable means mounting said ramp bars for joint vertical movement along said pairs of vertical standards, said cable means comprising sets of cables operatively connected to the opposite ends of said ramp bars and extending to a common cable actuating means capable of simultaneously paying out and reeling in said sets of cables, said sets of cables being arranged, upon actuation of said cable actuating means, to move said ramp sections from a lower position to an upper position, said ramp sections being aligned when in said lower position to define an inclined ramp leading to an underlying tier of a vehicle transport, and aligned when in the upper position to define a ramp leading to the uppermost tier of the vehicle transport, and releasable locking means automatically operable to engage and secure said ramp bars in their upper positions.

2. The ramp structure claimed in claim 1 wherein said releasable locking means comprise stops pivotally secured to said standards and movable from an operative to an inoperative position upon contact therewith by the upwardly moving ramp bars, spring means biasing said stops toward the operative position and acting, upon passage of said ramp bars upwardly beyond said stops, to return said stops to their operative position, and solenoid means for moving said stops to their inoperative position upon the initiation of downward movement of said ramp bars.

3. The ramp structure claimed in claim 1 wherein the means for actuating said cable comprises a winch having a plurality of drum sections of varying diameter, and wherein the sets of cables controlling each of the ramp bars is associated with a different drum section.

4. The ramp structure claimed in claim 1 wherein the means for actuating said cables comprises a hoist mounted on one of said pairs of vertical supports extending upwardly from said base frame, and wherein said hoist has a chain to which said sets of cables are secured by means of a cable bar.

5. An adjustable ramp structure for loading vehicles, such as automobiles, onto multiple tiered railroad cars, said ramp structure comprising an elongated generally rectangular base frame, sets of wheels secured to said base frame for movement of said ramp structure along a supporting surface, such as a loading dock, drive means for said wheels mounted on said base frame, a plurality of spaced apart pairs of vertically disposed standards projecting upwardly from said base frame at spaced apart intervals with the standards in each pair lying on opposite sides of said base frame, and ramp bars extending transversely of said base frame between said pairs of standards with the opposite ends of said ramp bars slidably received by said standards, ramp sections extending between adjacent pairs of said standards so as to define a continuous ramp extending lengthwise of said structure, said ramp sections each being hingedly connected at its leading end to one of said ramp bars with its opposite ends overlying and supported for sliding movement on the next adjacent ramp section, with the pivoted ends of said ramp sections all extending in the same direction, cable means mounting said ramp bars for simultaneous vertical movement along said pairs of vertical standards, said cable means comprising sets of cables operatively connected to the opposite ends of said ramp bars and extending to a common cable actuating means capable of jointly paying out and reeling in said sets of cables, said sets of cables being arranged, upon actuation of said cable actuating means, to move said ramp sections from a first position of use in which said ramp sections coact to define a continuous inclined ramp one end of which is at a height to deliver vehicles to a first tier of the railroad car being loaded and the opposite end of which is at essentially the level of the loading dock to a second position of the use in which the ramp sections are at a height to deliver vehicles to a second tier of the railroad car being loaded, releasable locking means automatically operable to engage and secure said ramp sections in one of their positions of use, a movable bridge member operatively connected to the outermost ramp section immediately adjacent the railroad car to be loaded, means for moving said bridge member from an operative to an inoperative position, control means operative to render said drive means for said ramp structure inoperative when said bridge member is in its operative position, whereby to prevent accidental movement of said ramp structure during loading operations, and a movable tail gate section at the opposite end of said ramp and means for raising and lowering said tail gate section.

6. The ramp structure claimed in claim 4 wherein said cable actuating means comprises a winch including a plurality of coaxial drums each of which is of a different diameter, and wherein each set of said cables is operatively connected to a different one of said drums.

7. The ramp structure claimed in claim 5 wherein said releasable locking means comprise stops pivotally mounted to said vertical standards and movable from an operative to an inoperative position upon contact therewith by the upwardly moving ramp sections, spring means biasing said stops to the operative position and acting, upon movement of the ramp sections upwardly toward one of their positions of use, to return said stops to their operative position upon passage of said ramp sections beyond said stops, and solenoid means for moving said stops to the inoperative position upon the initiation of movement of said ramp sections in the opposite direction.

References Cited in the file of this patent

UNITED STATES PATENTS

| | | |
|---|---|---|
| 171,726 | Hathaway | Jan. 4, 1876 |
| 379,146 | Yoakum | Mar. 6, 1888 |
| 754,775 | Johnson | Mar. 15, 1904 |
| 1,149,759 | Hedley | Aug. 10, 1915 |
| 1,164,143 | Swift | Dec. 14, 1915 |
| 1,778,847 | Dalin | Oct. 21, 1930 |
| 2,449,829 | Agren | Sept. 21, 1948 |
| 2,688,761 | Good | Sept. 14, 1954 |
| 2,698,974 | White | Jan. 11, 1955 |

OTHER REFERENCES

Railway Age Magazine, Feb. 15, 1960, page 23.